US009950654B1

(12) United States Patent
Contreras et al.

(10) Patent No.: US 9,950,654 B1
(45) Date of Patent: Apr. 24, 2018

(54) METHOD OF MAKING A HEADREST AND HEADREST CONSTRUCTION (71) Applicant: FXI, Inc., Media, PA (US)

(72) Inventors: Jose D. M. Contreras, West Covina, CA (US); Jovan Rafael Phillips, Hershey, PA (US)

(73) Assignee: FXI, Inc., Media, PA (US)

( * ) Notice: Subject to any disclaimer, the term of this patent is extended or adjusted under 35 U.S.C. 154(b) by 172 days.

(21) Appl. No.: 14/972,928

(22) Filed: Dec. 17, 2015

(51) Int. Cl.
*B60N 2/48* (2006.01)
*B60N 2/58* (2006.01)
*B29C 53/36* (2006.01)
*B68G 7/05* (2006.01)
*B60N 2/70* (2006.01)
*B60N 2/72* (2006.01)
*B29L 31/30* (2006.01)

(52) U.S. Cl.
CPC ............ *B60N 2/7017* (2013.01); *B29C 53/36* (2013.01); *B60N 2/48* (2013.01); *B60N 2/5883* (2013.01); *B60N 2/72* (2013.01); *B68G 7/05* (2013.01); *B29L 2031/3023* (2013.01); *B60N 2002/4888* (2013.01)

(58) Field of Classification Search
CPC ...... B60N 2/48; B60N 2/4805; B60N 2/5883; B60N 2002/4888; B60N 2002/4894; B29C 53/36; B29C 2053/367; B68G 7/05; B29L 2031/3023; Y10T 156/1028; Y10T 156/103
USPC .......................................................... 297/391
See application file for complete search history.

(56) References Cited

U.S. PATENT DOCUMENTS

| 5,425,836 | A | * | 6/1995 | Shimada | ................. | B29C 63/22 |
| | | | | | | 156/212 |
| 2004/0036329 | A1 | * | 2/2004 | Ashton | ............... | B60N 2/4817 |
| | | | | | | 297/220 |
| 2007/0257537 | A1 | * | 11/2007 | Asbury | .................... | A47C 7/38 |
| | | | | | | 297/391 |
| 2014/0217788 | A1 | * | 8/2014 | Norwood | .............. | B60R 21/233 |
| | | | | | | 297/216.12 |
| 2015/0097408 | A1 | * | 4/2015 | Nakata | ..................... | B60N 2/48 |
| | | | | | | 297/391 |

(Continued)

FOREIGN PATENT DOCUMENTS

DE          19606123 A1 *  8/1996  ............... B60N 2/48

OTHER PUBLICATIONS

Machine Translation of DE19606123A1. http://translationportal.epo.org/emtp/translate/?ACTION=description-retrieval&COUNTRY=DE&ENGINE=google&FORMAT=docdb&KIND=A1&LOCALE=en_EP&NUMBER=19606123&OPS=ops.epo.org%2F3.2&SRCLANG=de&apikey=TSMgTfrVAvNtryGl8Qlfbozj8DnAGIq&TRGLANG=en Sep. 25, 2017 (Year: 2017).*

*Primary Examiner* — Ryan D Kwiecinski
(74) *Attorney, Agent, or Firm* — Rogowski Law LLC (57) ABSTRACT

A method of making a headrest includes folding a first sheet of foam into a foam sleeve. The foam sleeve is slid over an internal core part of the headrest. The foam sleeve and the core part in turn are covered with an outermost cover. The cover is formed from (i) a first layer of material corresponding to a front face of the cover, (ii) a second sheet of foam having a periphery substantially the same shape as the first layer of material, affixed to a backside of the first layer, (iii) a second layer of the material corresponding to a rear face of the cover, and (iv) a third sheet of foam having a periphery substantially the same shape as the second layer of (Continued)

material, affixed to a backside of the second layer. The front and rear faces are joined together to form the cover.

15 Claims, 5 Drawing Sheets

(56) References Cited

U.S. PATENT DOCUMENTS

2015/0375648 A1* 12/2015 Navarro .................. B29C 44/14
297/391
2016/0167551 A1* 6/2016 Okamoto .................. B60N 2/48
297/391

* cited by examiner

METHOD OF MAKING A HEADREST AND HEADREST CONSTRUCTION

BACKGROUND OF THE INVENTION

The present invention is generally directed to a method of making a headrest, and more particularly, to an improved method of making a headrest, permitting simplified material specification customization, and a headrest construction resulting from this method.

A headrest is a well-known safety feature, generally in the automotive industry, which is attached or integrated into the top of a seat back to limit the rearward movement of an occupant's head relative to the occupant's torso. Generally, a headrest comprises an internal core part having two forks or posts projecting outwardly therefrom for attachment to the seat back, a molded foam covering the core part for cushioning, and an outermost cover covering the molded foam. The molded foam is typically manufactured from a liquid foam-forming formulation which is poured into a mold of desired configuration and allowed to cure to adopt the three-dimensional shape of the mold. After the foam has cured, the shaped, molded foam is removed from the mold and then covered with the covering for use.

One drawback of the molded foam is that modifications to the foam shape are challenging and time consuming after molding is complete. Another drawback of the molded foam is that modifications to the material specifications, which factor into achieving the appropriate cushioning, are also difficult and time consuming after molding is complete. It is costly to create new molds to vary the headrest configurations. Yet another drawback of the molded foam is that it is effectively a closed cell foam, having an outer skin layer around the exterior surface thereof as a result of the molding process, thereby restricting air circulation therethrough. Accordingly, tailoring of the shape and material specifications of the molded foam according to the intended application is challenging.

Therefore, improvements to forming headrests that are more readily modifiable and less costly continue to be sought.

BRIEF SUMMARY OF THE INVENTION

Briefly stated, one aspect of the present invention is directed to a method of making a headrest. The method comprises a step of folding a first sheet of foam of a predetermined peripheral shape into a foam sleeve. A cover is formed for the headrest with (i) a first layer of material having a periphery of a predetermined shape corresponding to a front face of a cover for the headrest, (ii) a second sheet of foam having a periphery of a shape the same or substantially the same as the predetermined shape of the first layer of material that is affixed to a backside of the first layer of material to obtain the front face of the cover for the headrest, (iii) a second layer of the material having a periphery of a predetermined shape corresponding to a rear face of the cover for the headrest, and (iv) a third sheet of foam having a periphery of a shape the same or substantially the same as the predetermined shape of the second layer of material that is affixed to a backside of the second layer of material to obtain the rear face of the cover for the headrest, and joining the front and rear faces of the cover for the headrest together to obtain the cover for the headrest. The foam sleeve is slid onto a core part of the headrest, and the foam sleeve and core part in turn are covered with the cover for the headrest. The combination of foam sleeve and cover permits design and production of headrests in an infinite variety of different support characteristics.

Another aspect of the present invention is directed to a headrest having a sleeve formed of one foam sheet or multiple layers of foam sheets that may be folded to create the sleeve, and a cover formed of layers of material that may include also foam sheets appended or affixed thereto that cover the sleeve. The sleeve is slid onto a core part of the headrest, and the foam sleeve and core part are in turn covered with the cover for the headrest.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a headrest which is presently preferred. It should be understood, however, that the disclosure is not limited to the precise arrangements and instrumentalities shown. In the drawings.

DESCRIPTION OF THE DISCLOSURE

Certain terminology is used in the following description for convenience only and is not limiting. The words "lower," "bottom," "upper," "top," "right" and "left" designate directions in the drawings to which reference is made. The words "inwardly," "outwardly," "upwardly" and "downwardly" refer to directions toward and away from, respectively, the geometric center of the headrest, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-7 a headrest, generally designated 10, in accordance with a preferred embodiment of the present invention. As will be explained in further detail below, the headrest 10 generally comprises an innermost core part 12, a middle foam sleeve 16, and an outermost headrest cover 46.

Figure 1:
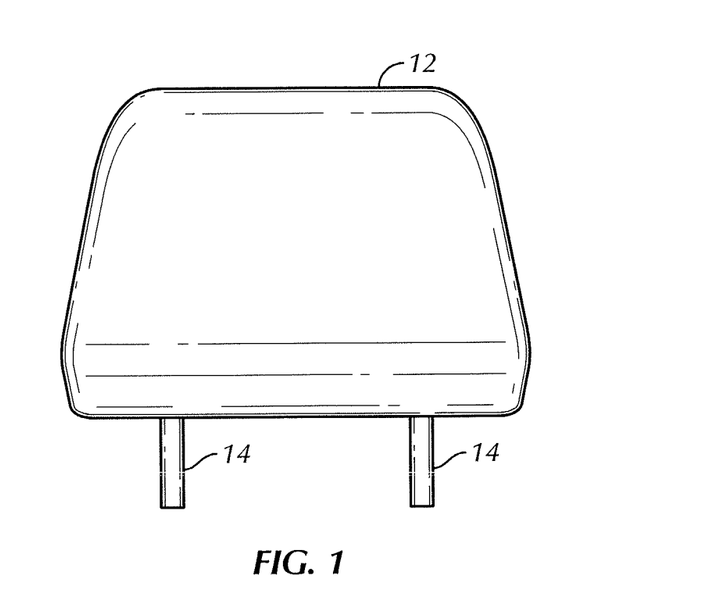
FIG. 1 is front elevational view of a core part of a headrest according to a preferred embodiment of the invention.
Figure 2:
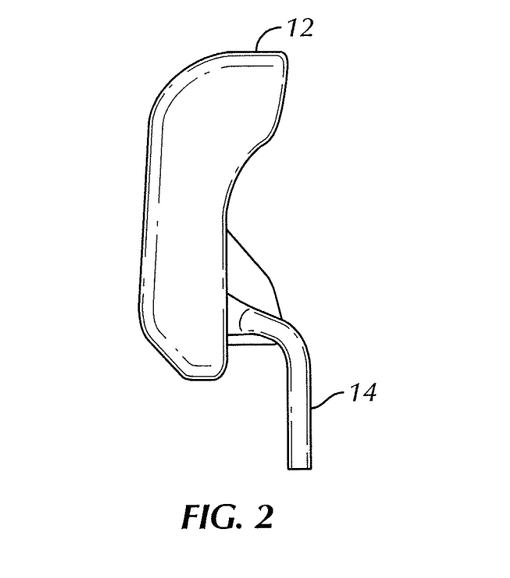
FIG. 2 is a side elevational view of the core part of FIG. 1.

Referring to FIG. 1, the core part 12, i.e., the innermost component of the headrest 10, includes a fixation device 14 extending outwardly and downwardly therefrom (FIG. 2) for attachment to a seat back (not shown); such as, for example, without limitation, for attachment to a seat back of a seat of an automobile. In the illustrated embodiment, the core part 12 takes the form of an expanded polypropylene ("EPP") core part having a substantially trapezoidal shape, and the fixation device 14 takes the form of a plurality of forks 14 or posts extending outwardly and downwardly from a rear side of the EPP core part 12 for engagement with the seat back (not shown). As should be understood, however, the core part 12 and the fixation device 14 may take the form of other core parts and fixation devices for attaching the headrest to a seat back, currently known or that later become known.

Figure 3A:
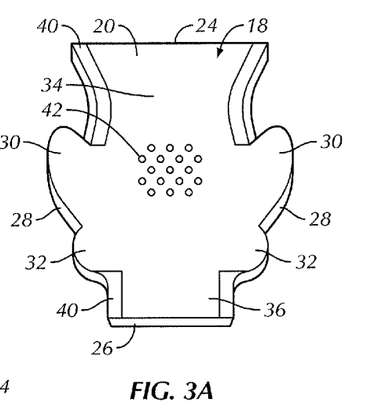
FIG. 3A is a top elevational view of a generally planar foam sheet prior to folding into a foam sleeve of the headrest according to the preferred embodiment of the invention.

Referring to FIG. 3A, the foam sleeve 16, i.e., the middle layer of the headrest 10, is formed from at least one sheet of foam 18, e.g., an open cell, closed cell or reticulated flexible polyurethane foam, having a generally planar front face 20 and an opposing generally planar reverse face 22. As should be understood by those of ordinary skill in the art, any foam sheet described herein may equivalently be referred to in the art as a foam slab. In some embodiments, the foam sheet 18 may comprise multiple layers of foam affixed to one another, having the same or different material properties and/or peripheral shape. The foam sheet 18 is cut, e.g., by computer-numeric-control ("CNC") or die cut, into a predetermined peripheral shape, foldable to receive, e.g., generally fittingly, the shape of the core part 12. In the illustrated embodiment, for example (FIGS. 3A-3C), the peripheral shape of the foam sheet 18 includes a substantially straight upper edge 24, a substantially straight bottom edge 26 and two substantially symmetrical, opposing side edges 28 extending between the upper and bottom edges 24, 26. Optionally, and as shown in the illustrated embodiment, the opposing side edges 28 include at least one pair of opposing outwardly curved lobes 30. Optionally, and as also shown in the illustrated embodiment, the opposing side edges 28 may also include a second pair of opposing outwardly curved lobes 32. In the illustrated embodiment, the second pair of curved lobes 32 are smaller than the first pair of curved lobes 30.

Figure 3B:
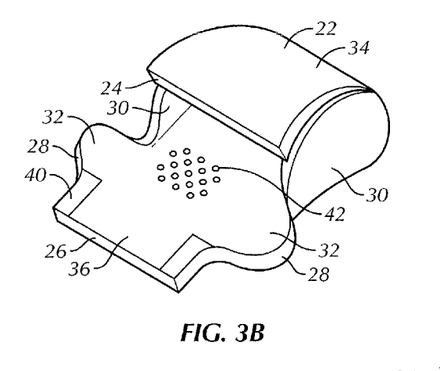
FIG. 3B is a right side perspective view of the foam sheet of FIG. 3A, with a first pair of curved lobes thereof folded upwardly and an upper portion of the foam sheet folded upwardly about the periphery of the curved lobes.
Figure 3C:
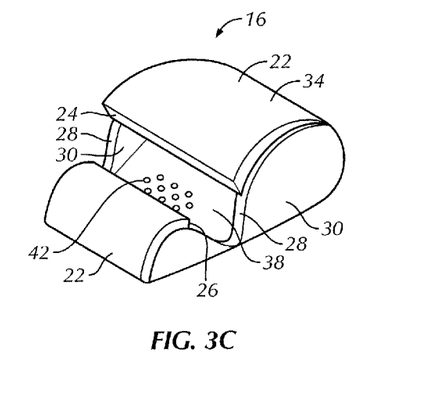
FIG. 3C is a right side perspective view of the foam sheet of FIG. 3B, with a second pair of curved lobes thereof folded upwardly and a lower portion of the foam sheet folded upwardly about the periphery of the curved lobes, resulting in the foam sleeve.

As shown in FIGS. 3B and 3C, the generally planar foam sheet 18 is folded to form the foam sleeve 16. Referring to FIG. 3B, the opposing curved lobes 30 are folded upwardly into a substantially perpendicular orientation relative to the generally planar faces 20, 22, such that the side edges 28 of the lobes 30 are elevationally above the front face 20. An upper portion 34 of the foam sheet 18, i.e., between the folded lobes 30 and the upper edge 24, is likewise folded upwardly about a portion of the periphery of the lobes 30. The periphery of the front face 20 of the upper portion 34 is joined with the side edges 28 of the lobes 30. In the illustrated embodiment, the second pair of curved lobes 32 also are folded upwardly into a substantially perpendicular orientation relative to the generally planar faces 20, 22, such that the side edges 28 thereof are elevationally above the front face 20. A lower portion 36 of the foam sheet 18, i.e., between the folded lobes 32 and the bottom edge 26, is folded upwardly about a portion of the periphery of the lobes 32. The periphery of the front face 20 of the lower portion 36 is joined with the side edges 28 of the lobes 32 (FIG. 3C).

In the illustrated embodiment, the upwardly folded upper and lower portions 34, 36 of the foam sheet 18 are joined with the upwardly folded curved lobes 30, 32, respectively, via an adhesive layer 40 therebetween. As should be understood by those of ordinary skill in the art, however, the upper and lower portion portions 34, 36 of the foam sheet 18 may be joined with the curved lobes 30, 32, respectively, via any of numerous different attachment methods, currently known or that later become known, such as, for example, without limitation, via laminating such as with adhesive or by flame lamination, hook and loop (Velcro) attachment, taping, sewing, or the like. Additionally, any combination thereof may be employed. The folding of the upper and lower portions 34, 36 onto a portion of the upwardly extending curved lobes 30, 32, respectively, creates the foam sleeve 16 with an opening 38 for receiving the core part 12 therethrough.

As shown in FIGS. 3A-3C, the foam sleeve 16 optionally may include a plurality of apertures 42, i.e., a suspension bed, extending from the front face 20 toward the reverse face 22 for assisting in expelling air out of the foam through the apertures 42 when a user places his/her head onto the headrest 10, and, thereby, permit a user's head to sink further into the headrest 10 for more cushioned head support. As should be understood by those of ordinary skill in the art, increasing the number of the apertures 42 permits increased air expulsion from the foam sleeve 16, resulting in a user's head sinking further into the headrest 10. Therefore, the number, size, shape and/or location of apertures 42 may be selected to vary the softness of the headrest 10 according to desired comfort and support specifications.

Properties of the foam sheet 18 (which folds into the foam sleeve 16), e.g., foam density, indentation force deflection ($IFD_{25}$) and thickness, are also selected when making the foam sheet 18, in a manner well understood by those of ordinary skill in the art, as another additional or alternative method to obtain desired comfort and support specifications. Hardness is typically measured as IFD ("indentation force deflection"). Specifically, $IFD_{25}$ is the force required to compress the foam to 25% of its original thickness or height using the test method set out in ASTM D-3574. For example, in one embodiment, the foam sheet 18 defines a density within the range of approximately 0.8 pounds-per-cubic foot to approximately 8 pounds-per-cubic foot. The foam sheet 18 also defines an indentation force deflection ($IFD_{25}$) within the range of approximately 7 pounds-force to approximately 150 pounds-force, and a generally uniform thickness within the range of approximately 5 mm to approximately 12 mm. Preferably, the foam sheet 18 defines a density within the range of approximately 1.7 pounds-per-cubic foot to approximately 2.2 pounds-per-cubic foot, an indentation force deflection (IFD$_{25}$) within the range of approximately 40 pounds-force to approximately 45 pounds-force and a thickness within the range of approximately 8 mm to approximately 12 mm.

Figure 5A:
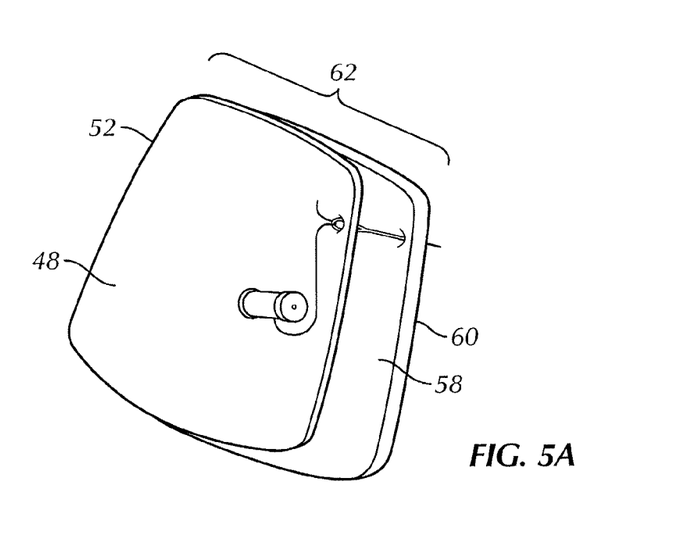
FIG. 5A is a front and right side perspective view of a front face of a cover of the headrest according to the preferred embodiment of the invention.
Figure 5B:
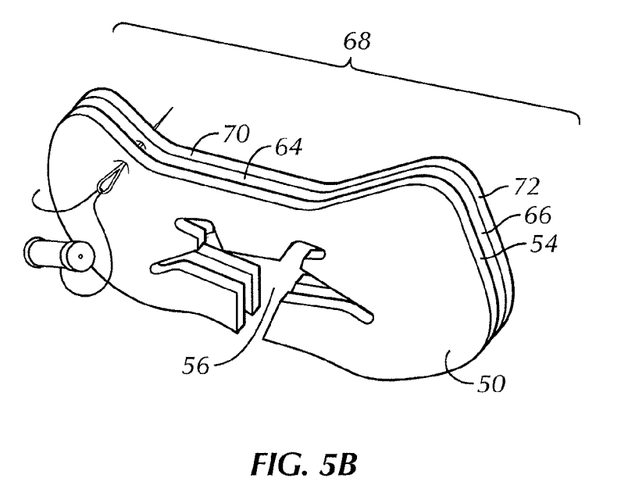
FIG. 5B is rear and left side perspective view of a rear face of the cover of the headrest according to the preferred embodiment of the invention.
Figure 5C:
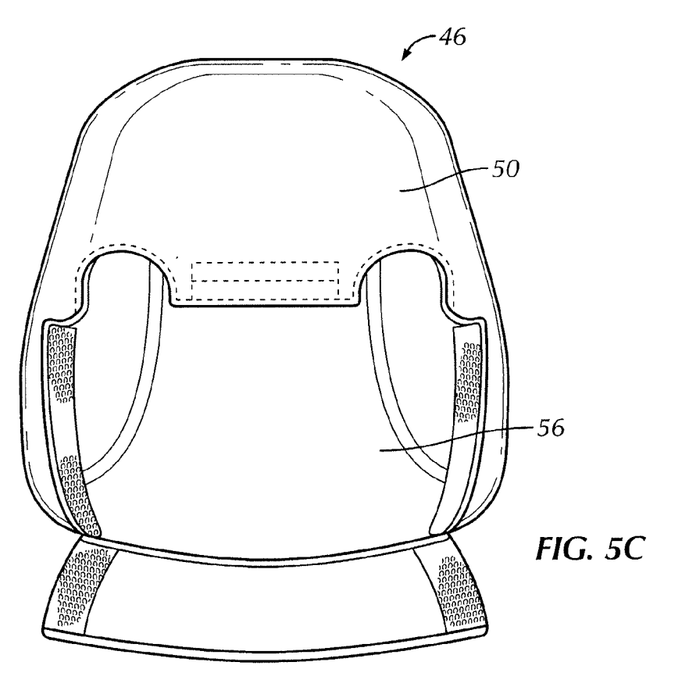
FIG. 5C is a rear elevational view of the cover of the headrest according to the preferred embodiment of the invention.
Figure 6:
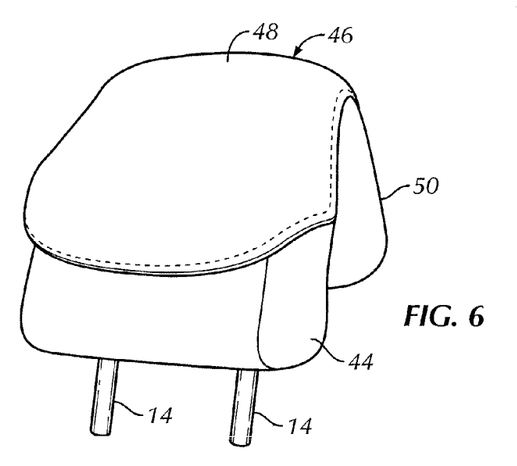
FIG. 6 is a front and right side perspective view of the cover during placement onto the foam sleeve and the core part of FIG. 4.

Referring to FIGS. 5A-5C, the cover 46, i.e., the outermost layer of the headrest 10, is comprised of a first layer of material 48 and a second layer of material 50, as will be described in further detail below. The first layer of material 48 has a periphery 52 of a predetermined shape, i.e., is cut, e.g., CNC or die cut, into a predetermined shape, generally corresponding to a front face of the cover 46 for the headrest 10. In the illustrated embodiment (FIG. 5A), for example, the first material layer 48 has a substantially trapezoidal shape corresponding to the substantially trapezoidal peripheral shape of the core part 12. The second material layer 50 has a periphery 54 of a predetermined shape, e.g., CNC or die cut, into a predetermined shape, generally corresponding to a rear face of the cover 46 for the headrest 10. In the illustrated embodiment (FIG. 5C), the second material layer 50 also has a substantially trapezoidal peripheral shape to correspond to the substantially trapezoidal peripheral shape of the core part 12. As should be understood by those of ordinary skill in the art, however, the first and second material layers 48, 50 of the cover 46 may take the form of different shapes and sizes, e.g., such as shown in FIG. 5B. As shown in FIGS. 5B and 5C, the rear material layer 50 includes an aperture 56 to accommodate the fixation device 14 extending outwardly and downwardly from the rear of the core part 12. The front and rear material layers of the cover 48, 50 form the outermost layers of the headrest 10 and may be leather, vinyl, fabric or the like. Alternatively, any combination thereof may be employed.

Referring to FIG. 5A, the cover 46 also includes a sheet of foam 58, e.g., an open cell, closed cell or reticulated flexible polyurethane foam, affixed to the backside of the first material layer 48 to form a front face 62 of the cover 46. The foam sheet 58 has a periphery 60 of a shape substantially the same as the peripheral shape of the first layer 48. In the illustrated embodiment, the first material layer 48 and the foam sheet 58 are sewn together in a manner well understood by those of ordinary skill in the art. Where the first material layer 48 is a leather or fabric layer, the foam sheet 58 may be sewn thereto. As should be understood by those of ordinary skill in the art, however, the first material layer 48 and the foam sheet 58 may be affixed together via other methods currently known or that later become known. For example, where the first material layer 48 is a vinyl layer, the foam sheet 58 may alternatively be laminated thereto with adhesive and/or by flame lamination in a manner well understood by those of ordinary skill in the art.

Referring to FIG. 5B, the cover 46 further includes at least one sheet of foam 64, e.g., an open cell, closed cell or reticulated flexible polyurethane foam, affixed to the backside of the second material layer 50 to form a rear face 68 of the cover 46. The foam sheet 64 has a periphery 66 of a shape substantially the same as the peripheral shape of the second material layer 50. The foam sheet 64 also includes substantially the same opening 56. In the illustrated embodiment, the second material layer 50 and the foam sheet 64 are sewn together. As explained above, where the second material layer 50 is a leather or fabric layer, the foam sheet 64 is sewn thereto. The second material layer 50 and the foam sheet 64 may, however, be affixed together via other methods currently known or that later become known, such as, without limitation, where the second material layer 50 is a fabric or vinyl layer, the foam sheet 64 may alternatively be laminated thereto with adhesive and/or by flame lamination.

Optionally, multiple sheets of foam may be affixed to the first and second material layers 48, 50 in successive order, as another means for achieving desired comfort specifications or for achieving the desired three-dimensional shape of the headrest 10. For example, in the illustrated embodiment of FIG. 5B, the rear face 68 includes a second foam sheet 70 having a periphery 72 of a shape substantially the same as the peripheral shape of the second material layer 50 affixed to the backside of the foam sheet 64. The foam sheet 70 also includes substantially the same opening 56 to accommodate the projection of the fixation device 14.

Similarly to the foam sheet 18, properties of the foam sheets 58, 64 and 70, e.g., foam density, indentation force deflection and thickness, are also selected when making the foam sheets 58, 64 and 70 to obtain desired comfort and support specifications. For example, in one embodiment, the foam sheets 58, 64 and 70 each define a density within the range of approximately 0.8 pounds-per-cubic foot to approximately 8 pounds-per-cubic foot. The foam sheets 58, 64 and 70 also each define an indentation force deflection (IFD$_{25}$) within the range of approximately 7 pounds-force to approximately 150 pounds-force, and a generally uniform thickness of each sheet within the range of approximately 2 mm to approximately 20 mm. Preferably, the foam sheets 58, 64 and 70 each define a density within the range of approximately 0.8 pounds-per-cubic foot to approximately 1.7 pounds-per-cubic foot, an indentation force deflection (IFD$_{25}$) within the range of approximately 40 pounds-force to approximately 45 pounds-force and a generally uniform thickness of each sheet within the range of approximately 5 mm to approximately 10 mm.

Figure 4:
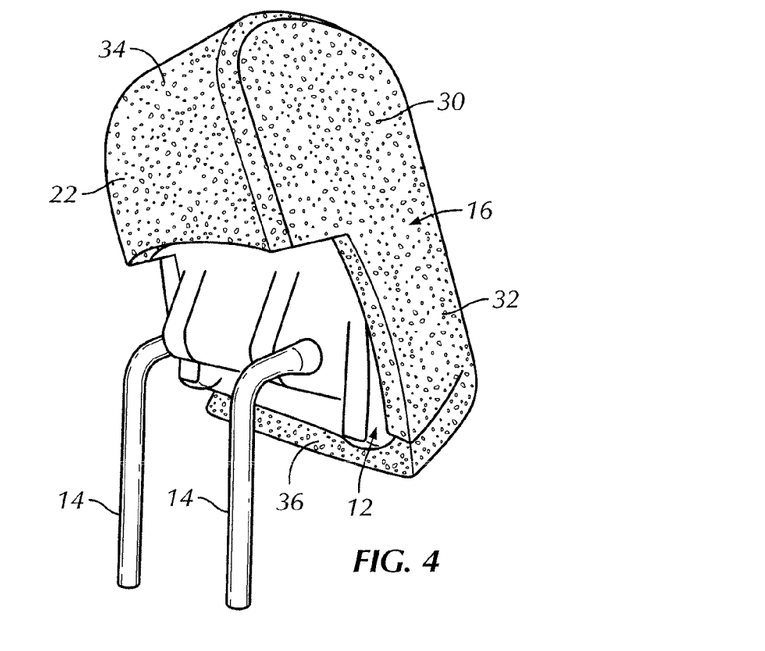
FIG. 4 is a rear and left side perspective elevational view of the foam sleeve of FIG. 3C covering the core part of FIG. 1.
Figure 7:
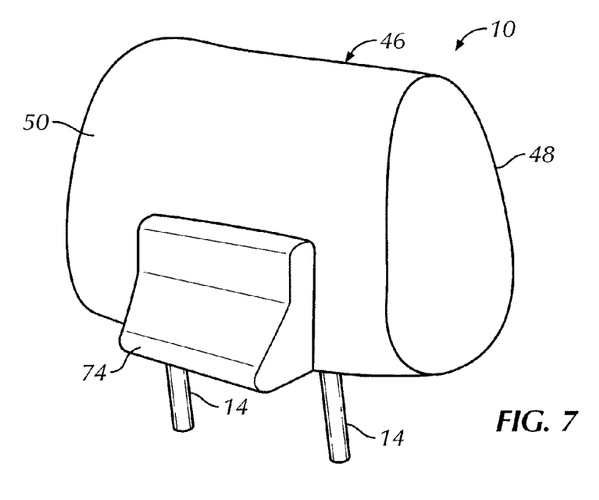
FIG. 7 is a rear and left side perspective view of the assembled headrest according to the preferred embodiment of the invention.

To assemble the headrest 10, the foam sleeve 16 is slid onto the core part 12, as shown best in FIG. 4. Alternatively, in embodiments where the foam sleeve 16 does not include the curved lobes 30, 32, the foam sheet 18 may be wrapped around the core part 12. As shown best in FIG. 6, the cover 46 thereafter covers the foam sleeve 16 and the core part 12. Optionally, the foam sleeve 16 and the core part 12 may be covered with a plastic layer 44 (FIG. 6) prior to sliding on the cover 46 to reduce friction and more easily slide the cover 46 thereon. Afterwards, as shown in FIG. 7, a polymeric cap 74 is engaged with the rear face 68 of the cover 46 to cover the opening 56.

Another advantage of the headrest 10 constructed according to the invention is the opportunity afforded to vary the air permeability of the foam sheet 18 used to form the foam sleeve 16 and/or the air permeability of the foam sheets 58, 64 and 70 used to form the cover 46. The molded foams of the prior known headrests have air permeability generally 10 ft$^3$/min/ft$^2$. The outer skin that develops when foam is molded limits the air permeability. In contrast, the foam sheet 18 may have an air permeability that is orders of magnitude higher, such as, e.g., 784 ft$^3$/min/ft$^2$. The foam sheets can be reticulated (open or remove the cell walls of the foam structure) using any one of a number of techniques: thermal reticulation, chemical reticulation, foam crushing, and in situ reticulation.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A method of making a headrest, comprising:
   folding a first sheet of foam of a predetermined peripheral shape into a foam sleeve, wherein the first sheet of foam has a front face and a reverse face, a too edge, a bottom edge and side edges, wherein said side edges have two or more opposed pairs of curved lobes, and wherein the step of folding comprises (i) folding the top edge downwardly over the front face, (ii) folding a first pair of the curved lobes upwardly so that the side edges are above the front face and joining portions of the front face to side edges of the curved lobes, (iii) folding the bottom edge upwardly over the front face, and (iv) folding the second pair of curved lobes upwardly so that the side edges are above the front face and joining portions of the front face to side edges of the second set of curved lobes to form the foam sleeve;
   sliding the foam sleeve onto a core part of the headrest;
   covering the foam sleeve with a layer of plastic;
   forming a cover for the headrest with (i) a first layer of material having a periphery of a predetermined shape corresponding to a front face of a cover for the headrest, (ii) a second sheet of foam affixed to a backside of the first layer of material to obtain the front face of the cover for the headrest, (iii) a second layer of the material having a periphery of a predetermined shape corresponding to a rear face of the cover for the headrest, and (iv) a third sheet of foam affixed to a backside of the second layer of material to obtain the rear face of the cover for the headrest, and joining the first layer of material and second layer of material of the cover for the headrest together to obtain the cover for the headrest; and
   covering the foam sleeve, the core part, and the layer of plastic with the cover for the headrest.

2. The method of claim 1, wherein the step of forming a cover further comprises (v) a fourth sheet of foam affixed to a backside of the third sheet of foam.

3. The method of claim 1, wherein the first layer of material ad second layer of material for the cover of the headrest each are a material selected from the group consisting of: leather, vinyl, and fabric.

4. The method of claim 1, wherein the first layer of material and the second layer of material for the cover of the headrest are formed of leather or fabric, and wherein the second sheet of foam is sewn to the backside of the first layer of material and the third sheet of foam is sewn to the backside of the second layer of material.

5. The method of claim 1, wherein the first layer of material and the second layer of material for the cover of the headrest is are formed of fabric or vinyl, and wherein the second sheet of foam is laminated to the backside of the first layer of material and the third sheet of foam is laminated to the backside of the second layer of material.

6. The method of claim 1, wherein the step of joining portions of the front face to side edges of the curved lobes comprises joining by a method selected from the group consisting of: laminating, adhesively attaching, hook and loop (Velcro) attachment, and taping.

7. The method of claim 1, wherein the first, second and third sheets of foam each define a density within the range of approximately 0.8 pounds-per-cubic-foot to approximately 8 pounds-per-cubic-foot.

8. The method of claim 1, wherein the first, second and third sheets of foam each define an indentation force deflection within the range of approximately 7 pounds-force to approximately 150 pounds-force.

9. The method of claim 1, wherein the first sheet of foam defines a thickness within the range of approximately 5 mm to approximately 12 mm.

10. The method of claim 1, wherein each of the second and third sheets of foam define a thickness within the range of approximately 2 mm to approximately 20 mm.

11. The method of claim 1, wherein the first sheet of foam has a front face and a reverse face and includes a plurality of apertures extending from the front face toward the reverse face.

12. The method of claim 1, wherein the first sheet of foam comprises multiple layers of foam affixed to one another.

13. The method of claim 1, further comprising affixing multiple sheets of foam to the first layer of material when forming the cover for the headrest.

14. The method of claim 1, further comprising affixing multiple sheets of foam to the second layer of material when forming the cover for the headrest.

15. The method of claim 1, wherein a fixation device extends outwardly from the core part for attachment to a seat back.

* * * * *